Figure 4:
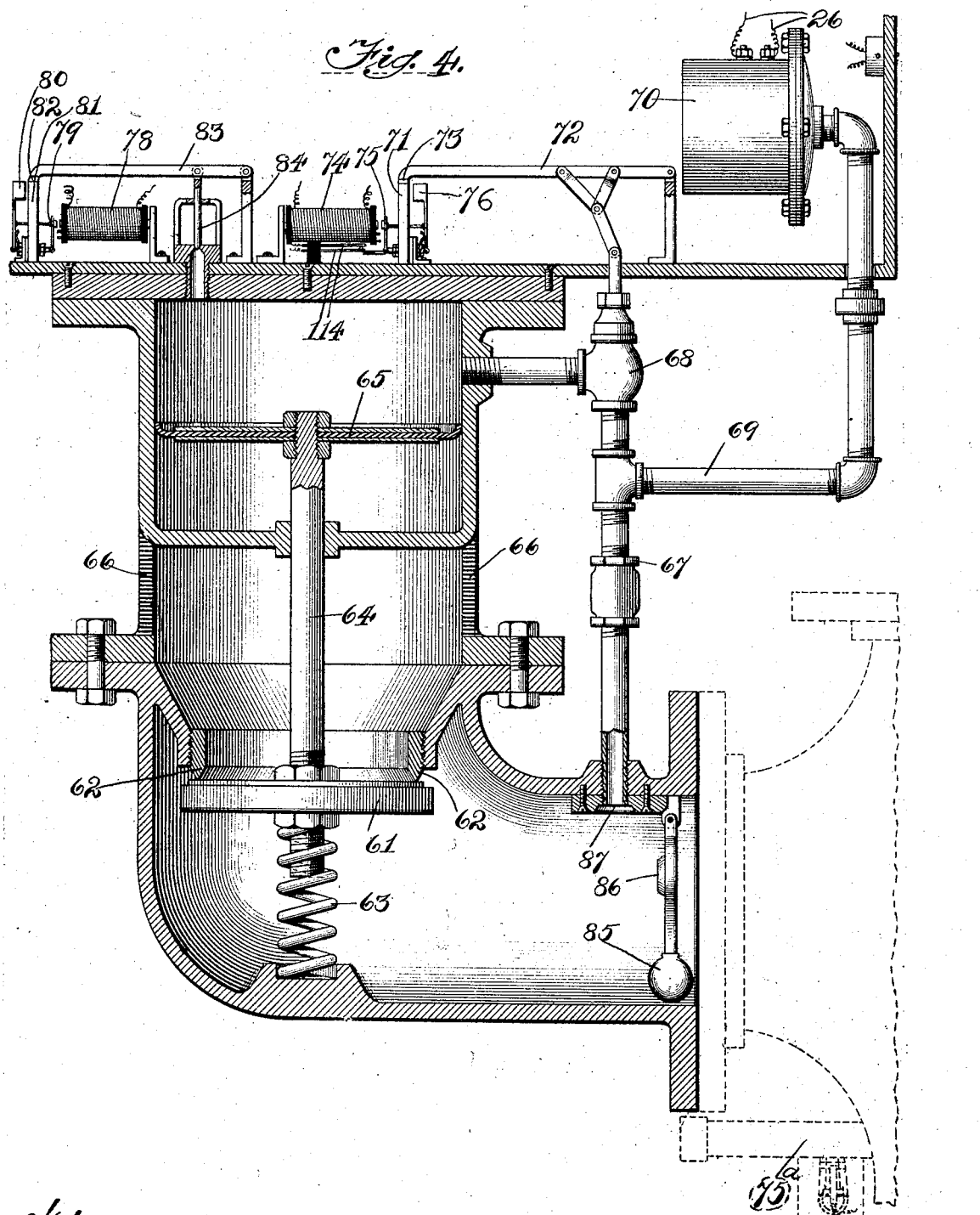

R. B. HEWITT & J. G. NOLEN.
AUTOMATIC FIRE EXTINGUISHER AND SIGNALING SYSTEM.
APPLICATION FILED MAY 29, 1903.
938,859.
Patented Nov. 2, 1909.
12 SHEETS—SHEET 1.
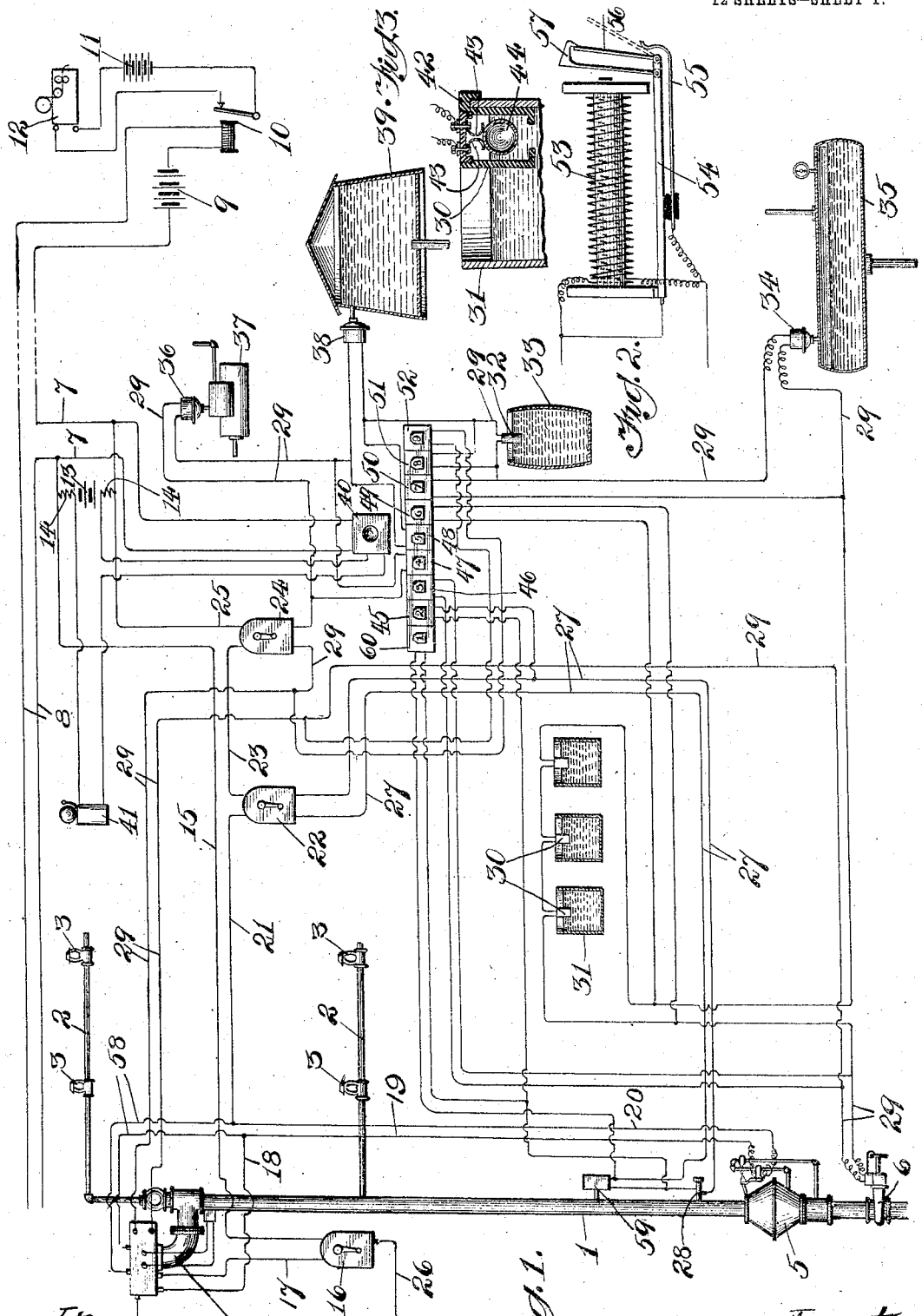

R. B. HEWITT & J. G. NOLEN.
AUTOMATIC FIRE EXTINGUISHER AND SIGNALING SYSTEM.
APPLICATION FILED MAY 29, 1903.

938,859.

Patented Nov. 2, 1909.
12 SHEETS—SHEET 2.

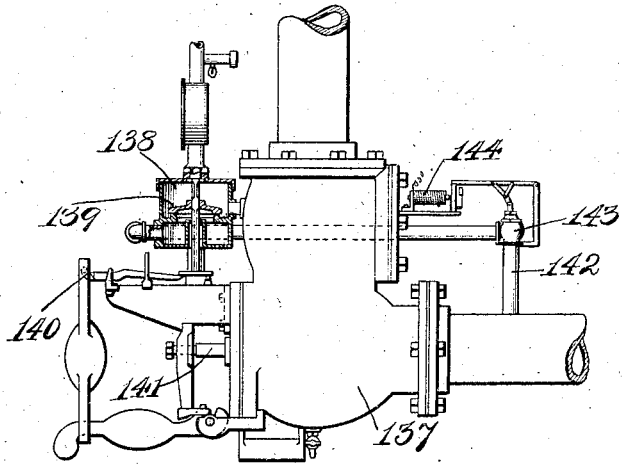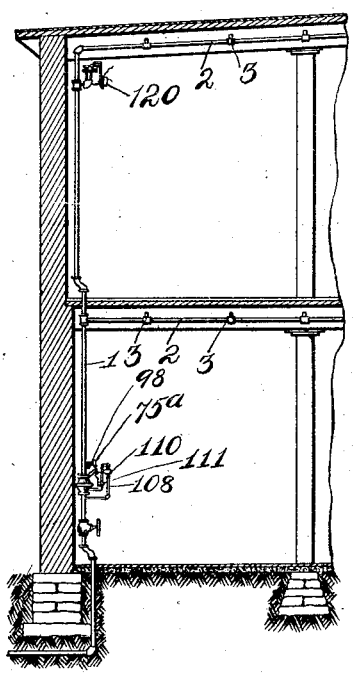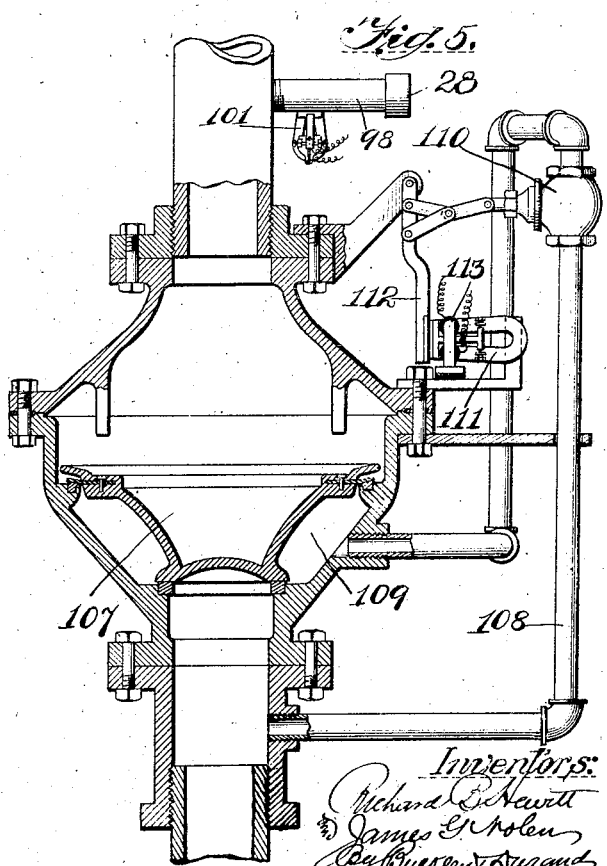

R. B. HEWITT & J. G. NOLEN.
AUTOMATIC FIRE EXTINGUISHER AND SIGNALING SYSTEM.
APPLICATION FILED MAY 29, 1903.

938,859.

Patented Nov. 2, 1909.
12 SHEETS—SHEET 7.

Witnesses
Ira D. Perry
Robert H. Weir

Inventors:
Richard B. Hewitt
and James G. Nolen
by Bulkly & Durand
attys

R. B. HEWITT & J. G. NOLEN.
AUTOMATIC FIRE EXTINGUISHER AND SIGNALING SYSTEM.
APPLICATION FILED MAY 29, 1903.
938,859.
Patented Nov. 2, 1909.
12 SHEETS—SHEET 8.
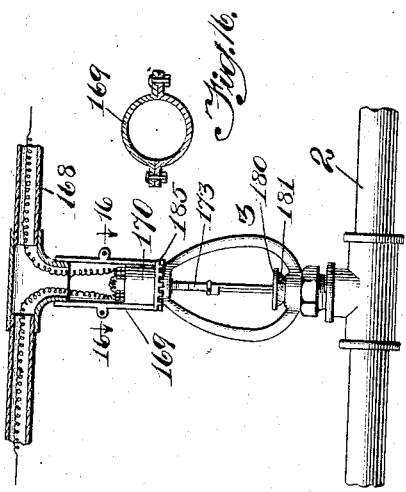
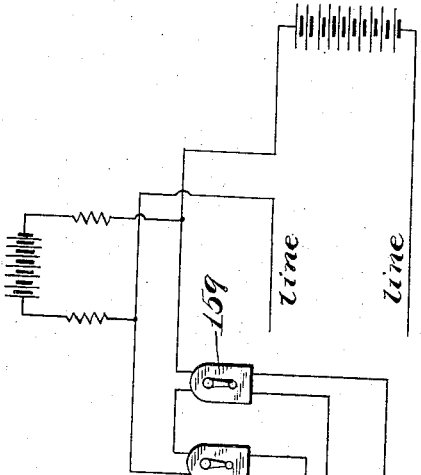
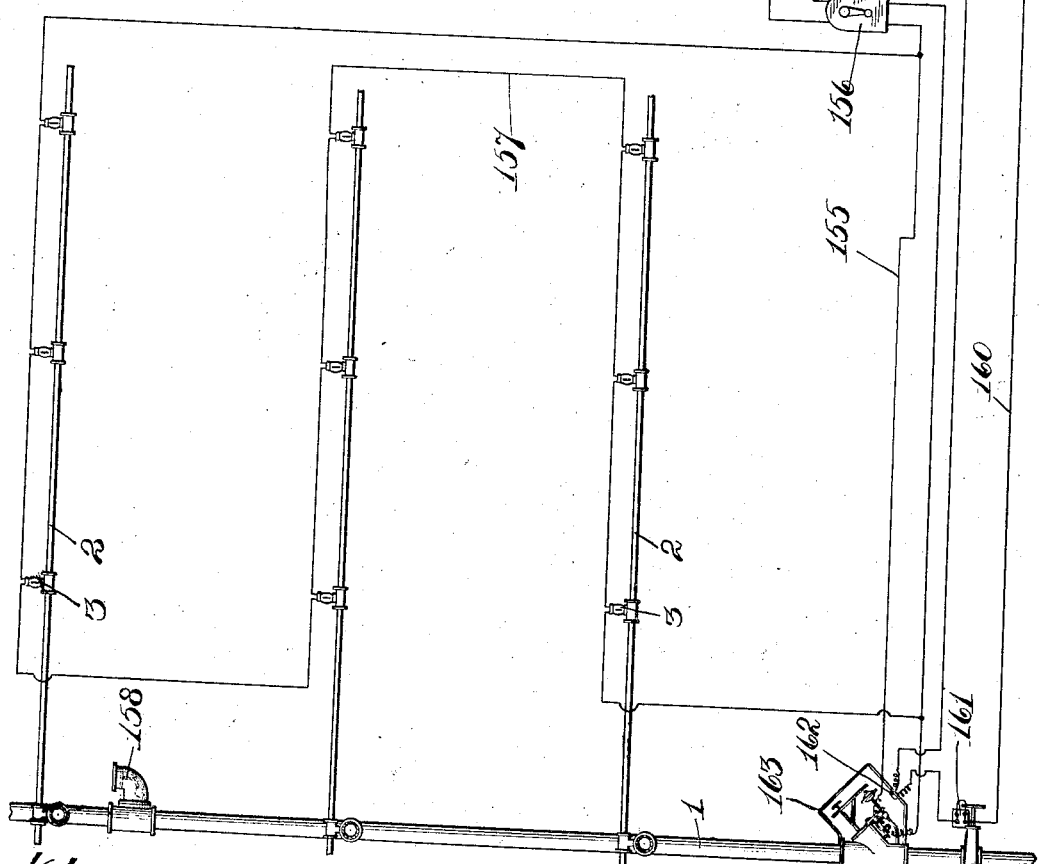

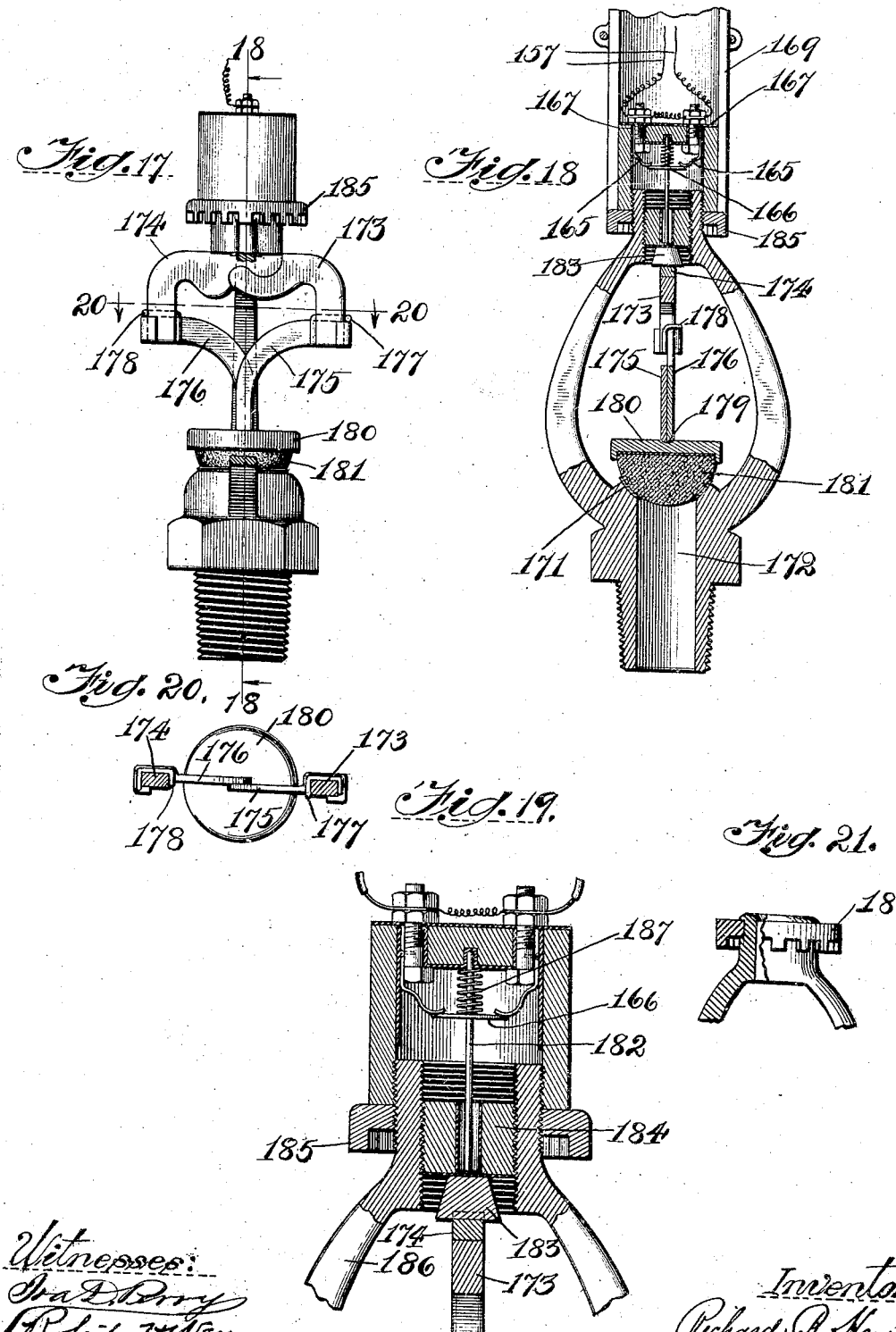

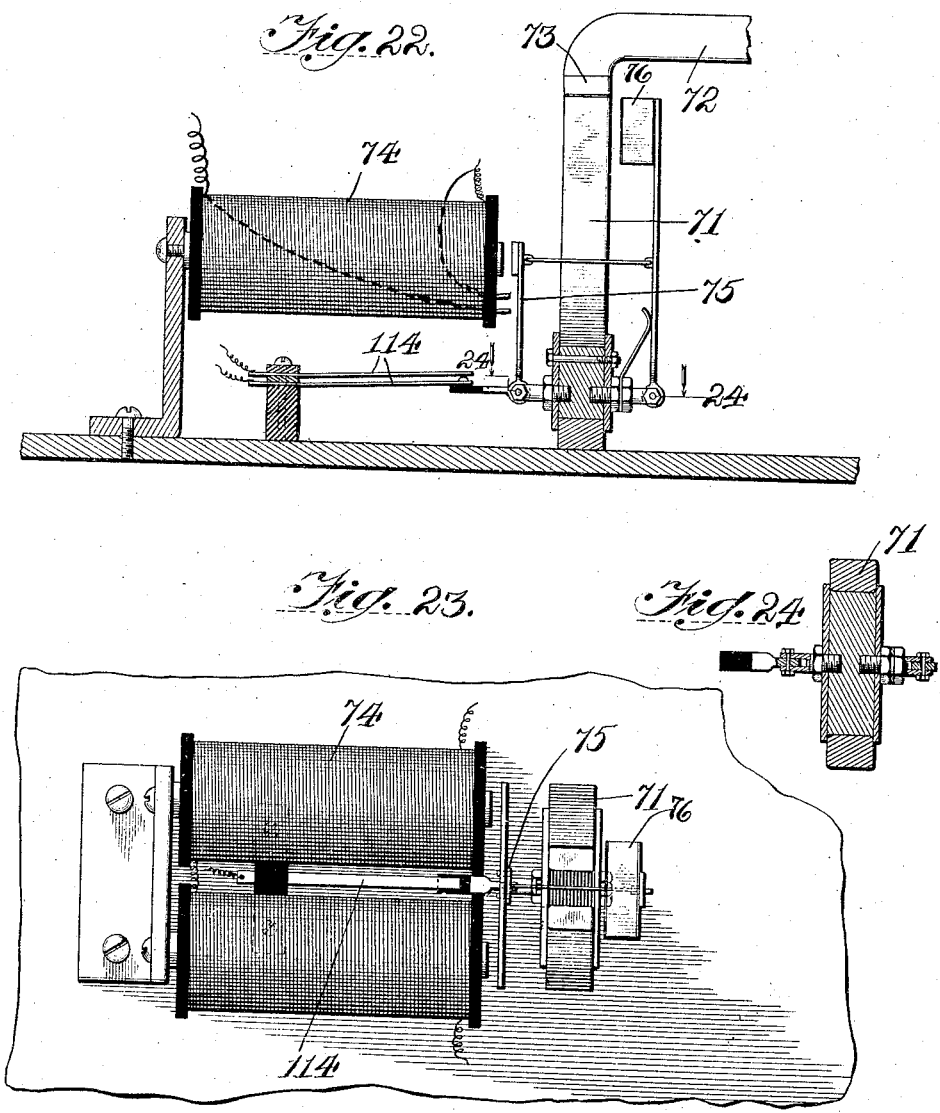

R. B. HEWITT & J. G. NOLEN.
AUTOMATIC FIRE EXTINGUISHER AND SIGNALING SYSTEM.
APPLICATION FILED MAY 29, 1903.
938,859.
Patented Nov. 2, 1909.
12 SHEETS—SHEET 11.
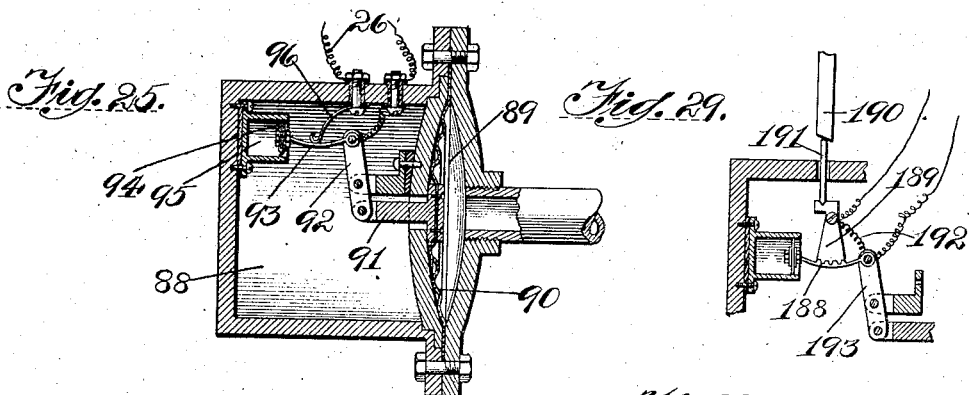
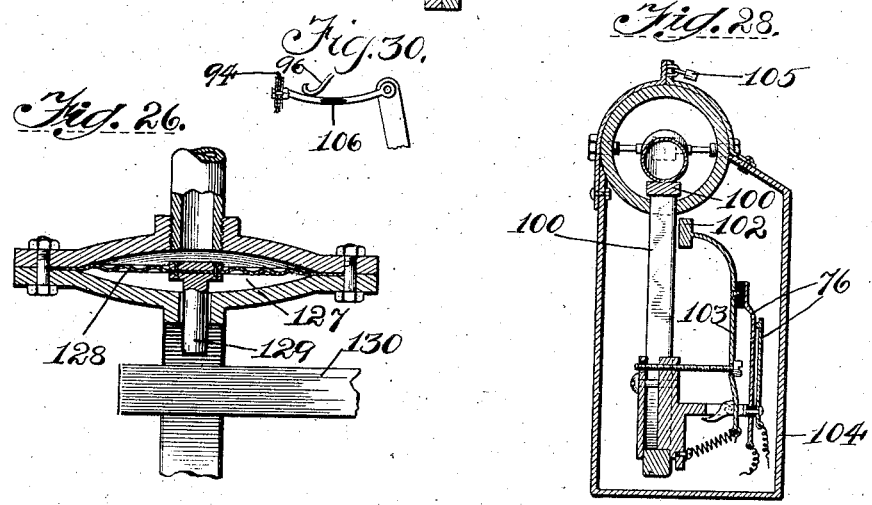
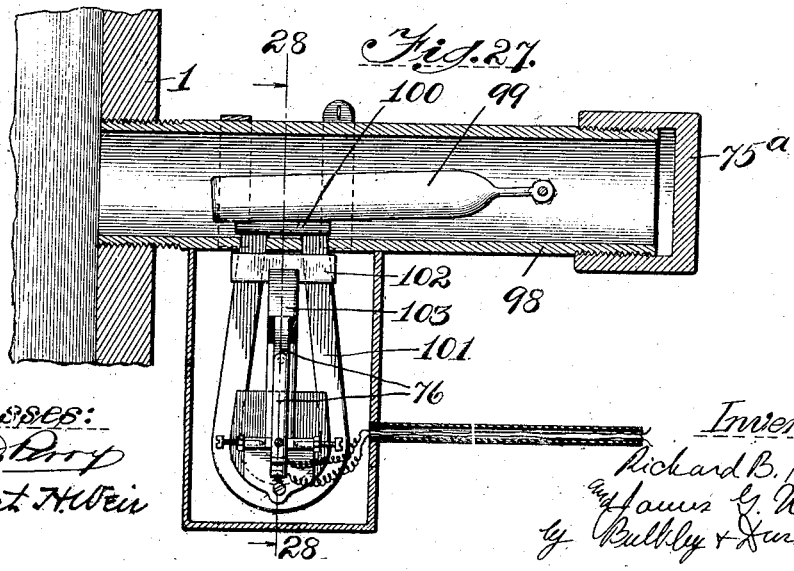
Witnesses:
Inventors:
Richard B. Hewitt
James G. Nolen

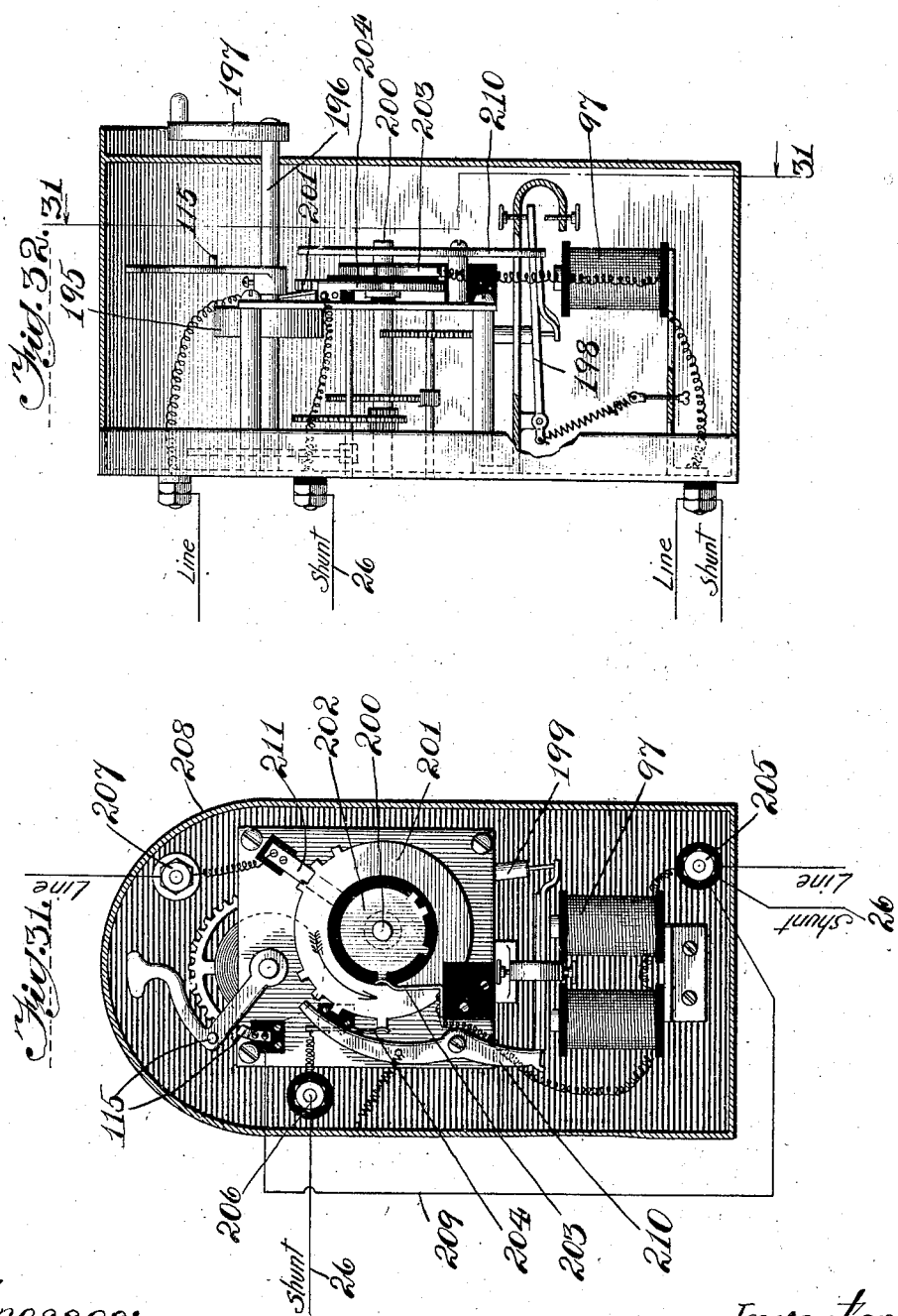

UNITED STATES PATENT OFFICE.

RICHARD B. HEWITT AND JAMES G. NOLEN, OF CHICAGO, ILLINOIS; SAID NOLEN ASSIGNOR OF ONE-HALF OF HIS RIGHT TO FRANK B. COOK, OF CHICAGO, ILLINOIS.

AUTOMATIC FIRE-EXTINGUISHER AND SIGNALING SYSTEM.

938,859.  Specification of Letters Patent.  Patented Nov. 2, 1909.

Application filed May 29, 1903. Serial No. 159,232.

*To all whom it may concern:*

Be it known that we, RICHARD B. HEWITT and JAMES G. NOLEN, citizens of the United States of America, and residents of Chicago, Cook county, Illinois, have invented a certain new and useful Improvement in Automatic Fire-Extinguisher and Signaling Systems, of which the following is a specification.

In dry pipe fire extinguisher systems, as heretofore constructed, it is often the case that the water does not escape from the sprinkler heads until the fire has gained considerable headway. This is due to the fact that the air in the dry portion of the piping must escape through the particular sprinkler heads which have responded to the heat before the water can fill the distributing pipes. Difficulty has also been experienced in securing certainty of action on the part of the dry pipe valves, it often happening that a dry pipe valve will, for various reasons, stick and fail to open promptly upon the bursting of some of the sprinkler heads. Again, in dry pipe fire extinguisher systems as heretofore constructed, the dry pipe valves are liable to leak, and with the old arrangement there was no way of detecting this leakage of water past the dry pipe valve and into the dry portion of the piping. Furthermore, prior to our invention, automatic fire extinguisher systems have not been equipped with any efficient signaling apparatus, whereby an attendant could locate the trouble by simply glancing at a bank of annunciators.

Generally stated, the objects of our invention are to remedy the foregoing and other defects and difficulties of the old systems. Accordingly, and as a means for obtaining an instantaneous, or practically instantaneous, discharge of water as soon as one or more sprinkler heads open, we provide the dry portion of the riser with an automatic relief valve adapted to automatically open and effect a quick, or practically instantaneous, release of the air from the dry portion of the piping upon the opening of one or more of said sprinkler heads. We also provide an arrangement whereby the dry pipe valve is controlled by the sprinkler heads to the extent that it will be positively opened upon the opening of one or more of said sprinkler heads. As a feature of further and special improvement, we provide a float arrangement adapted to be applied to the riser immediately above the dry pipe valve, and adapted to operate electric switch contacts which are entirely outside of the piping, and which are adapted to control the circuit of a signal alarm device, the float arrangement involving no movable parts extending through the piping or the casing of the float. In addition to the foregoing, and as a means for readily locating trouble in the system, we provide a system of electrical signaling involving a bank of annunciators. The arrangement is such that these annunciators can be employed for readily locating the trouble in the system, one annunciator being adapted to respond to any tampering with the main valve, another annunciator adapted to respond to any tampering with the relief valve, another annunciator being adapted to respond to a lowering of the pressure in the steam pump below the required point, another annunciator being adapted to respond to a lowering of air pressure below the required point, and still others being adapted to show whether the various pails, barrels, water-tanks, etc., are properly filled with water. We also provide improved sprinkler heads and various details and features of improvement adapted to increase the general efficiency of an automatic fire extinguisher system of this particular character. The nature and advantages of our invention will, however, hereinafter more fully appear.

Figure 8:
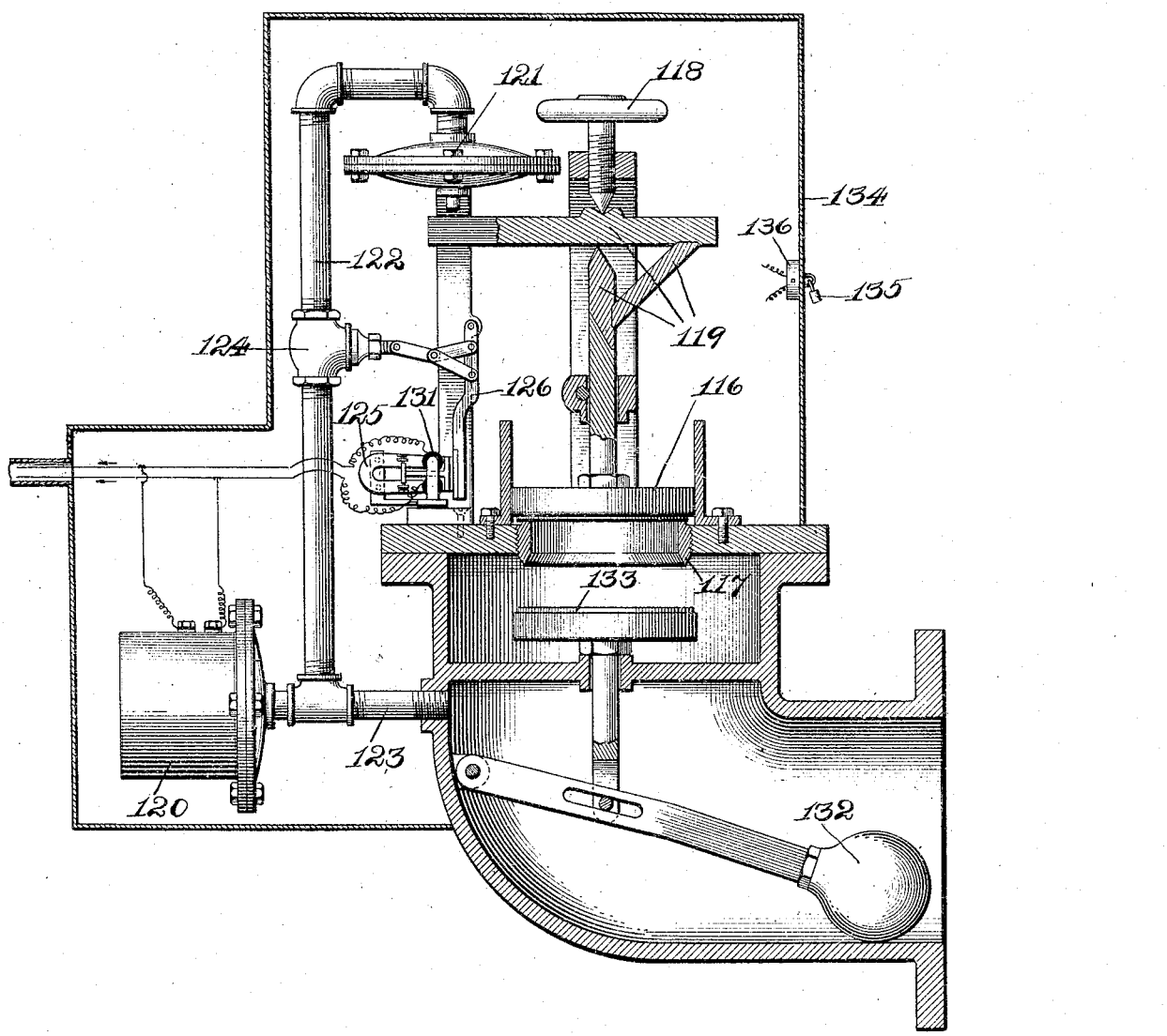
Figure 9:
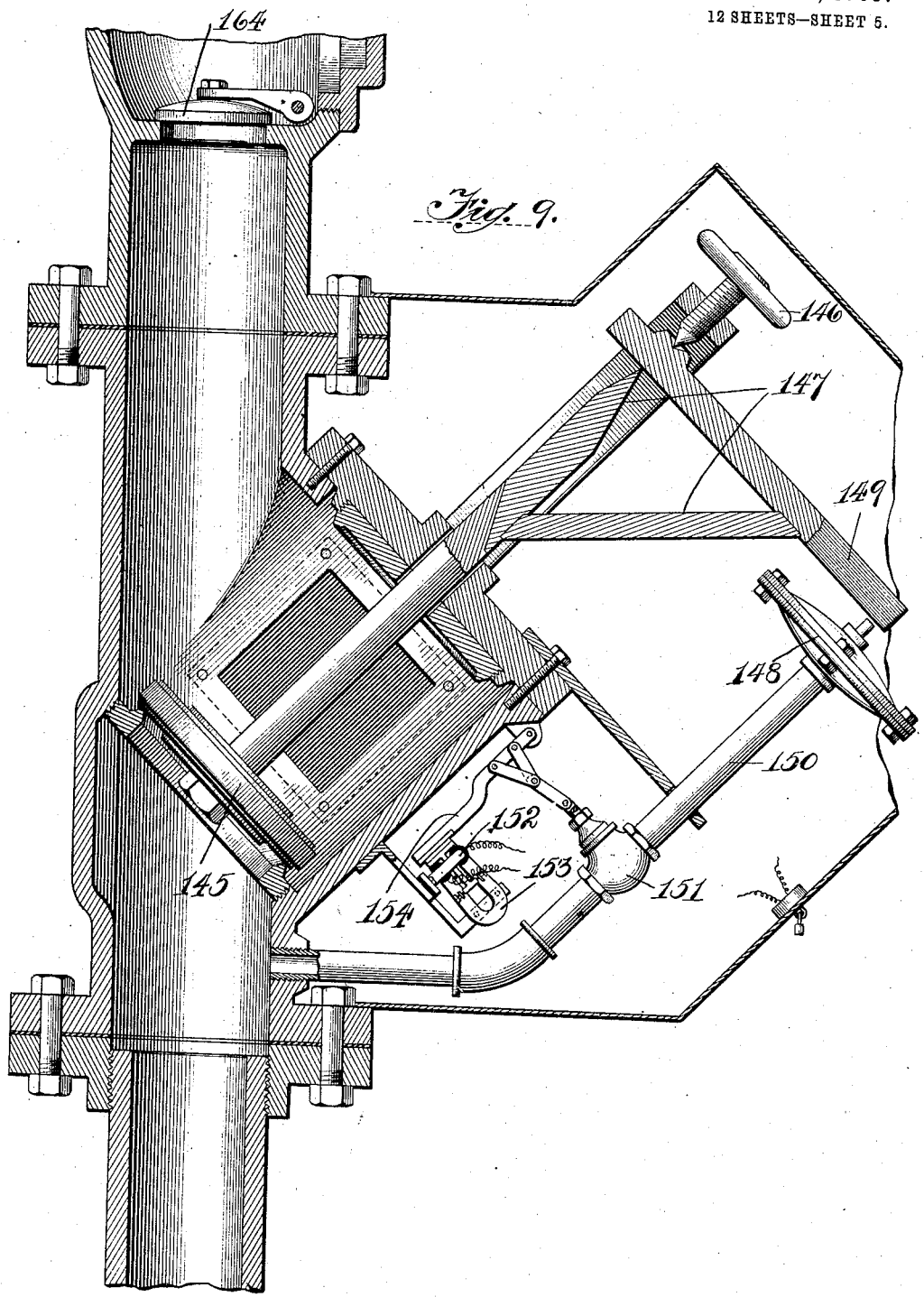
Figure 10:
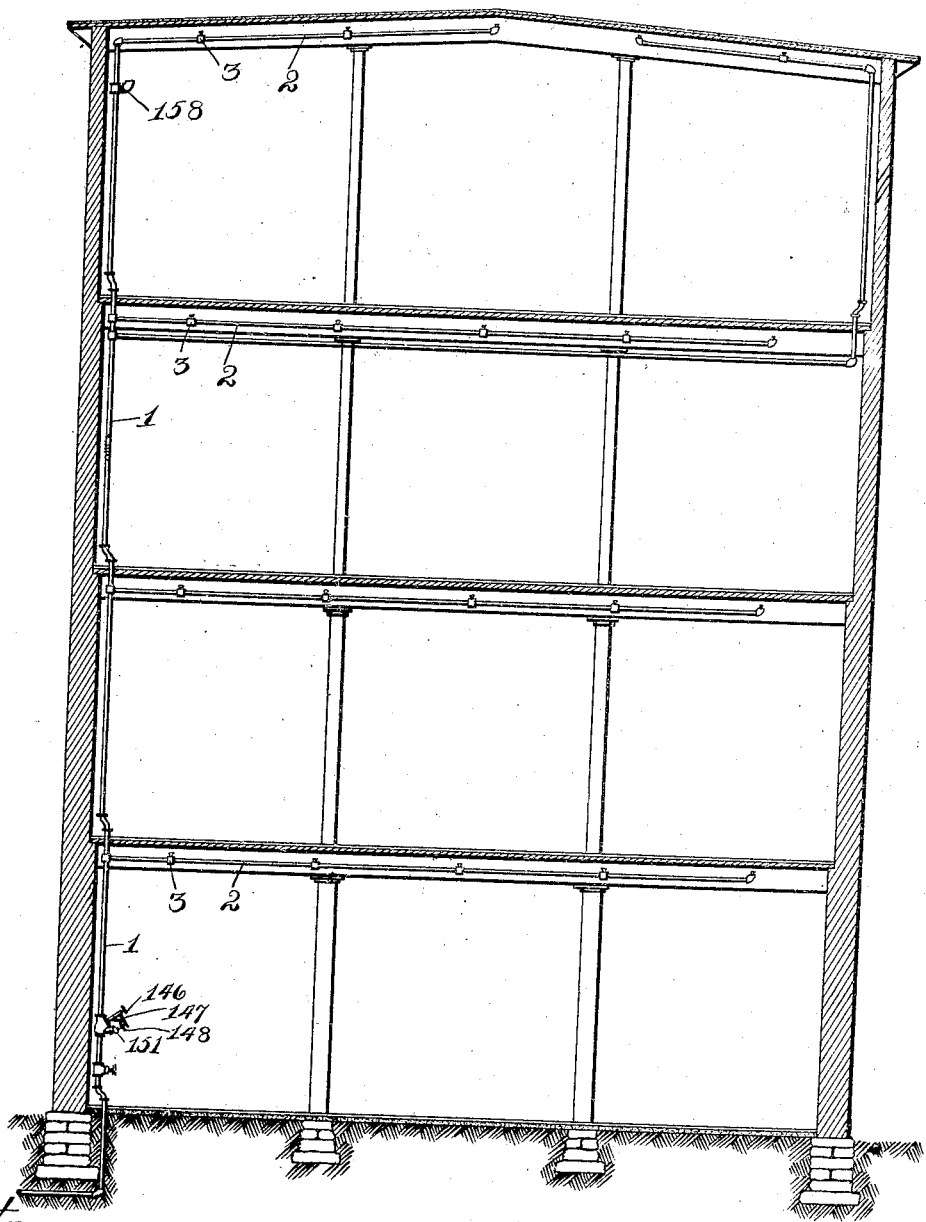
Figure 11:
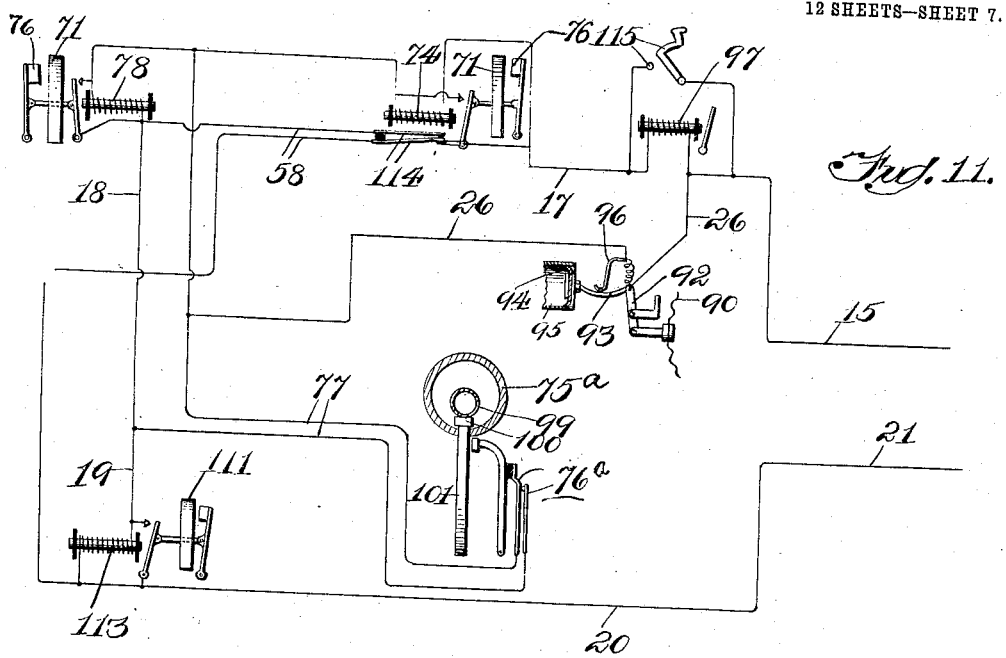
Figure 12:
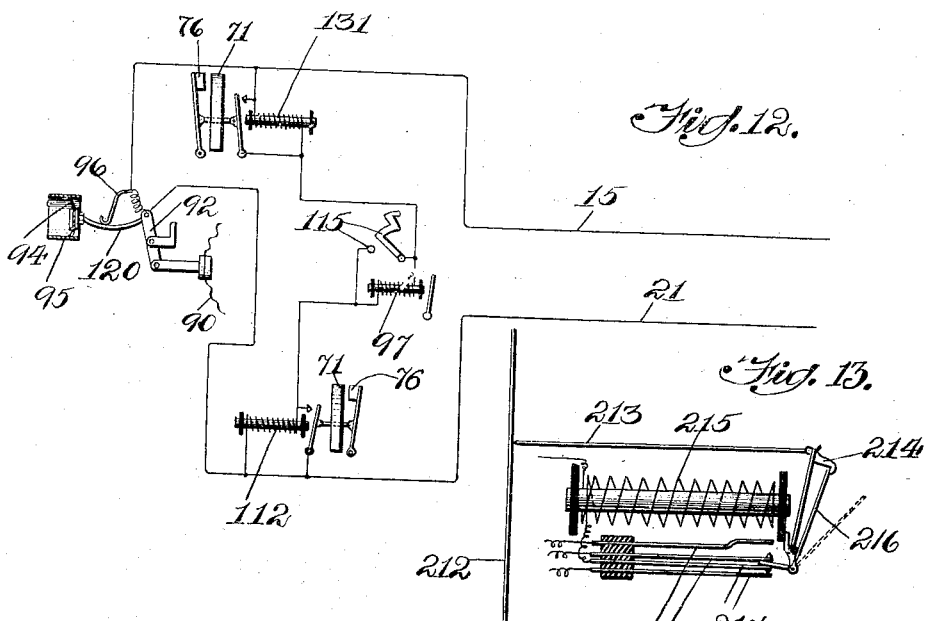
Figure 13:
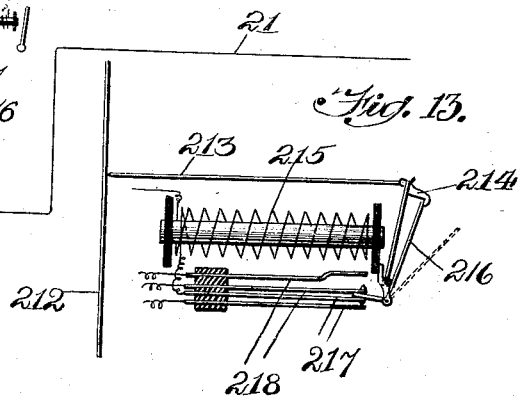

In the accompanying drawings: Figure 1 is a diagram illustrating an automatic fire extinguisher and signaling system involving the principles of our invention. Fig. 2 is a detail diagrammatic view of one of the annunciators. Fig. 3 is a detail of one of the circuit breaking or signal initiating devices which we associate with the pails, barrels, etc., of the system. Fig. 4 is an enlarged sectional view of the relief valve and associated devices shown in Fig. 1. Fig. 5 is an enlarged sectional view of the dry pipe valve and associated devices shown in Fig. 1. Fig. 6 shows another form of dry pipe valve. Fig. 7 illustrates the method of arranging the piping in a building. Fig. 8 is an enlarged sectional view showing another form of relief valve. Fig. 9 is an enlarged sectional view showing another form of dry pipe valve. Fig. 10 shows the manner in which the piping of a system employing the valve shown in Fig. 9 is arranged in a building. Fig. 11 is a diagram illustrating the electrical connections of the dry pipe valve and relief valve shown in Fig. 1. Fig. 12 is a diagram illustrating the electrical connections between a dry pipe valve such as the one shown in Fig. 1 and a relief valve such as the one shown in Fig. 8. Fig. 13 shows the card punching device of the clock shown in Fig. 1. Fig. 14 is a diagram illustrating one method of using the dry pipe valve shown in Fig. 9. Fig. 15 illustrates our improved sprinkler head, and shows also the method employed for inclosing the wiring extending between the sprinkler head and the dry pipe valve shown in Fig. 14. Fig. 16 is an enlarged cross-section on line 16—16 in Fig. 15. Fig. 17 is an enlarged side elevation of one of our improved sprinkler heads. Fig. 18 is a vertical section on line 18—18 in Fig. 17. Fig. 19 is an enlarged sectional view of the upper portion of the sprinkler head shown in Fig. 18. Fig. 20 is a horizontal section on line 20—20 in Fig. 17. Fig. 21 shows the top of the improved sprinkler head as adapted for use without the electrical connections. Fig. 22 is an enlarged side elevation of the electro-magnetic devices shown in Fig. 4 for effecting an opening of the relief valve. Fig. 23 is a plan of the device shown in Fig. 22. Fig. 24 is a horizontal section on line 24—24 in Fig. 22. Fig. 25 is an enlarged sectional view of the pressure operated circuit breaking device shown in Fig. 4 for controlling the normally closed shunt around the electro-magnets shown in Figs. 22 and 23. Fig. 26 is an enlarged sectional view illustrating the pressure operated plunger for tripping the valves shown in Figs. 8 and 9. Fig. 27 is a longitudinal section of the form of float device which we apply to different portions of the piping, and which we combine with electro-magnetic devices for operating signaling or other devices. Fig. 28 is a cross-section on line 28—28 in Fig. 27. Figs. 29 and 30 show modified forms of the circuit breaking device shown in Fig. 25. Figs. 31 and 32 are, respectively, a front elevation and a side elevation of the devices and mechanism inclosed in the casing of the master box which we employ for transmitting signals, Fig. 31 being a vertical section on line 31—31 in Fig. 32.

Referring to Fig. 1, the riser 1 can be of any suitable known or approved character, and can be provided with the usual distributing pipes 2, the latter leading to the different parts of the building in which the system is located. For the broader purposes of our invention, the sprinkler heads 3, mounted on the said distributing pipes, can be of any suitable known or approved construction. In order, however, that the opening of any one of these sprinkler heads may be accompanied by an instantaneous, or practically instantaneous, release of all the air from the piping, we provide the upper portion of the riser with a relief valve 4. This relief valve is controlled by the sprinkler heads through the medium of suitable electric circuits and devices hereinafter described, and is adapted to open and allow the air to escape freely and quickly, and to thereby permit the water to enter the piping and escape from the sprinkler heads as soon as any of the latter are opened. As far as the broader purposes of our invention are concerned, the dry pipe valve 5 can also be of any suitable known or approved construction, preferably, and in order that it may be positively opened by the sprinkler heads through the medium of suitable apparatus, it is of a character hereinafter described. The main valve 6 can also be of any desired construction, but is preferably provided with any suitable device for breaking a circuit when the valve is tampered with. All of the electrical apparatus involved in the system, as thus shown in Fig. 1, is either connected with or included in a loop 7—7 extending laterally from the main circuit 8 of a district messenger station. This line circuit can be provided at the central station with the usual central source of current 9, the relay 10, the local battery 11, and the recorder or tape machine 12. Any suitable signal receiving device can be substituted for the apparatus thus shown at the central station.

In order that the apparatus involved in the system may not be without a source of current in case a break occurs in the line 8, we provide a local battery 13, which is preferably bridged across the loop 7—7, and arranged to supply current through the resistance coils 14 connected at each side. Thus the local battery 13 does not interfere in any way with the normal flow of current over the line and through the various portions of the loop, but is at the same time adapted to supply current for the operation of various electro-magnetic devices involved in the system, should the system as a whole become cut off from the centralized source of current. The said loop 7—7, as illustrated, extends first by the conductor 15 to the master box or signal transmitting device 16, thence by the conductor 17 through a couple of electro-magnetic devices in the casing of the relief valve 4, by the conductors 18 and 19 to an electro-magnetic device associated with the dry pipe valve 5, thence by the conductors 20 and 21 to a similar master box or signal transmitting device 22, by the conductors 23 to a third master box or signal transmitting device 24, and finally back to the line by way of conductor 25. A shunt 26 extends around an electro-magnet in the master box 16 and also around one of the electro-magnetic devices in the casing of the relief valve 4. A shunt 27 extends around the releasing magnet in the box 22, this shunt including a float-operated circuit-breaking device 28. A third shunt 29 extends around the releasing magnet in the box 24. This third shunt includes a circuit breaking or signal initiating device associated with the casing of the valve 4, a similar circuit breaking device associated with the valve 6, float operated circuit breaking devices 30 for the pails 31, a similar float operated circuit breaking device 32 for the barrel 33, a pressure operated circuit breaking device 34 associated with the tank 35, another pressure operated circuit breaking device 36 associated with the steam pump 37, and a similar circuit breaking device 38 associated with the water tank 39. A circuit breaking device similar to the one shown in connection with the tank 35 is included in the shunt 26 of the box or signal transmitting device 16. The clock 40 and the local alarm 41 are connected in parallel to the battery 13, and are arranged in parallel with all the apparatus or devices included in the loop 7—7. The clock mechanism when operated as a result of a momentary or extended increase in the resistance of the loop is adapted to close the normally open circuit of the bell or alarm 41.

The circuit breaking devices 30 and 32 can be of the character shown in Fig. 3. As thus illustrated, the device consists of a small receptacle 42 adapted to hook onto the side of the bucket or other receptacle and provided with an aperture at its bottom. The upper portion of the receptacle 42 is provided with a couple of binding posts for receiving the shunt wires and also with a couple of contacts 43. These contacts are normally electrically connected by the metallic float 44, provided, of course, that the water in the pail or other receptacle is maintained at the proper height. An annunciator 45, of suitable form or construction, is connected in parallel with the circuit breaking device 28. A similar annunciator 46 is connected in parallel with the circuit-breaking device on the main valve 6. Another annunciator 47 is connected in parallel with the circuit opening device 36. The annunciator 48 is connected in parallel with the circuit opening device 38. In a similar way, the annunciator 49 is connected in parallel with the circuit breaking device 30 on the buckets 31. Another annunciator 50 is connected in parallel with the circuit breaking device 34. The next annunciator 51 is connected in parallel with the circuit breaking device 32 on the water barrel 33'. The remaining annunciator 52 is connected in parallel with the tamper or circuit breaking device on the casing of the valve 4. If desired, the annunciators can all be arranged in a bank, as illustrated in Fig. 1. Each annunciator can be constructed as shown in Fig. 2. As thus illustrated, the annunciator consists of an electro-magnet 53 adapted to normally constitute a portion of the circuit. The casing 54 and the insulated spring 54 are adapted, however, to constitute a normally open shunt or short circuit about the said magnet. Consequently, when the shutter 56 falls as a result of the energizing of the magnet and the forward movement of the armature 57, this normally open short-circuit is closed and the magnet completely short-circuited.

Suppose now that the building in which the system is located catches fire and that before the fire gains any headway the heat is sufficient to open one or two of the sprinkler heads. This, with the arrangement shown in Fig. 1, will cause a pulsation or variation of the air pressure in the piping, sufficient to operate the circuit breaking device in the shunt 26. This shunt being opened, the electro-magnets around which it extends are then energized, with the result that the relief valve 4 is opened. This opening of the relief valve, which takes place simultaneously, or practically simultaneously, with the opening of the sprinkler heads, effects a practically instantaneous release of the air from the piping, thereby permitting water to instantly open the dry pipe valve 5 and fill the distributing pipes. As will hereinafter appear, the electro-magnetic device for effecting an opening of the relief valve is also adapted to open a shunt or short circuit connection 58 extending around the electro-magnetic device which is associated with the dry pipe valve 5, and which when energized effects a positive opening of the said dry pipe valve. Thus, with the arrangement shown in Fig. 1, the sprinkler heads may be said to maintain a certain amount of control over the relief valve and the dry pipe valve, as the opening of any sprinkler head will cause not only an opening of the relief valve, but also the positive opening of the dry pipe valve. As illustrated in Fig. 1, and as hereinafter more fully described, the dry pipe valve is of that type in which upper and lower differential areas are employed for insuring a sufficient preponderance of air pressure to hold the valve normally closed. Such being the case, we effect a positive and automatic opening of this dry pipe valve by automatically admitting water pressure between the two differential areas upon the opening of one or more sprinkler heads. The opening of the shunt 26 also effects a release of the clockwork in the box 16, thereby causing a signal to be transmitted over the line circuit to the signal receiving device at the central station of the district messenger system. This signal is of a pre-determined character and is at once recognized at the central station as indicating the presence of fire in the building containing a certain box or signal transmitting device. The resistance introduced into the loop 7—7 by the opening of the shunt 26 also causes a sufficient current to be diverted through the parallel connections including the clock 40 and the bell or alarm 41 to operate the former and ring the latter. As will hereinafter be explained, the clock 40 is of the usual form or construction, and is provided with an electromagnetic device for making a puncture in a card or in a disk so as to record the exact time at which the alarm was given. If a leak occurs in the dry pipe valve 5, the water in entering the riser 1 will cause the float-operated circuit breaking device 28 to operate, and thereby introduce the resistance of the annunciator 45 into the shunt 27. The resistance of this shunt 27 being thus increased, sufficient current is diverted through the releasing magnet of the box 22 to release the normally wound up clock work at this box, and thereby cause a signal to be transmitted to the central station over a circuit including the short circuit connection which has been closed around the said annunciator. Thus, as will hereinafter be described, the box 22, like the boxes 24 and 16, is adapted to transmit a signal of a pre-determined character over a circuit including this shunt or a portion thereof, so as to indicate a certain thing, and is also adapted to transmit a signal of a different character in case of a mere break in one of the shunt conductors. The operation of the annunciator 45 will also be accompanied by a recording operation on the part of the clock 40 and a sounding of the alarm 41. With this arrangement, the attendant or inspector upon hearing the alarm or receiving the signal can easily locate the trouble by simply glancing at the bank of annunciators. In a similar manner, any attempt to tamper with the valve 4 will operate both the annunciator 52 and the box 24. Any attempt to tamper with the valve 6 will result in causing the shutter of annunciator 46 to fall, and in causing the box 24 to transmit a signal of a pre-determined character.

Suppose also that the attendant in the building where the system is located neglects to keep the pails 31 filled with water. In such case, one or more of the circuit breaking devices 30 will open the shunt 29 and thereby introduce the resistance of the annunciator 49 to the circuit. This also will be accompanied by a releasing of the clock-work in the box 24 and the falling of the shutter of said annunciator. Again, if the air pressure in the water tank 35 falls below the proper point, the annunciator 50 will be operated, and the box 24 will transmit the desired signal. So also if the water in the barrel 33 falls below the proper point, the annunciator 51 will be operated and the box 24 will transmit a signal. A failure to maintain the proper steam pressure in pump 37 will result in the falling of the shutter of the annunciator 47 and the releasing of the clock-work in the box 24. The proper conditions as to water supply must also be maintained in the tank 39, or otherwise the shutter of the annunciator 48 will fall and the box 24 will transmit a signal. And in each and every case, the alarm 41 will be sounded and the clock 40 will record the exact time at which the alarm was given. The pipe or riser 1 can also be provided with a pressure-operated switch or circuit breaking device 59, similar preferably to the pressure operated devices 36 and 34, hereinafter more fully described. This device 59 is connected in the shut 27 and arranged in series with the float operated device 28. An additional annunciator 60 can be connected in parallel with this pressure operated circuit breaking device 59. With this arrangement, a gradual leakage of air from the dry portion of the piping will cause the device 59 to open the shunt 27, thereby causing current to be diverted through the releasing magnet in the box 22 and also through the said annunciator 60. As in the other case, the clock 40 and the alarm 41 will also be operated. The attendant, hearing the alarm, can locate the trouble by inspecting the bank of annunciators. Observing that the shutter of annunciator 60 is down, he will immediately understand that the air is leaking from the dry portion of the piping.

Having thus described generally the nature and operation of our improved automatic fire extinguisher and signaling system, and having explained the various advantages incident to the different features thereof, we will now describe more in detail the construction of the various devices involved therein.

The relief valve shown in Fig. 1 may be constructed as illustrated in Fig. 4. As thus illustrated, the relief valve comprises a relatively small disk 61, adapted to be maintained normally upon the valve seat 62 by the spring 63. The valve stem 64 is also provided at its upper end with a relatively large disk 65. These two disks constitute differential areas for permitting a preponderance of air pressure above to overcome the pressure below and thereby open the passage controlled by the disk 61. The valve casing is provided with openings 66 through which the air can escape from the riser when the valve is opened. The means for opening the valve comprises the by-pass 67 provided with a normally closed by-pass valve 68. A branch 69 from this by-pass leads to the pressure operated circuit breaking device 70. The valve 68 is held normally closed by means of a permanent magnet 71 and a lever 72, the latter having its end provided with an armature 73 normally engaging the poles of the said magnet. The electro-magnet 74 is provided with an armature 75 adapted when attracted to draw the soft iron armature 76 into engagement with the poles of the permanent magnet 71. As will be seen by examining Fig. 11, the current is normally shunted or short-circuited around this electro-magnet 74 so as to prevent it from being energized. This shunt or short circuit is, however, controlled by the device 70, and hence as soon as a sprinkler head is opened the resulting pulsation in the air pressure will cause the device 70 to open said short-circuit or shunt. It is obvious that a sudden pulsation in the pressure causes the spring 93 to bend, thereby opening the circuit, and thus allowing the magnets 74 and 97 to become energized. This will result in a diversion of sufficient current through the magnet 44 to energize it and cause it to attract its armature, and thereby draw the soft iron armature 76 into contact with the poles of the permanent magnet. As soon as this occurs, the armature 76 absorbs all the magnetism of the said permanent magnet, allowing the armature 73 and the lever 72 to fly upward. This opens the valve 68, and permits air pressure to pass through the by-pass and exert pressure on the top of the disk 65. Owing to the difference in area between the two disks, the air pressure thus exerted on the disk 65 is sufficient to open the passage controlled by the disk 61, thereby permitting a quick and practically instantaneous release of the air from the piping through the opening 66. As soon as the water reaches the top of the riser it operates the float device 75ᵃ, hereinafter described, and thus spreads the contacts 76ᵃ which are in the shunt or short circuit 77 extending around the electro-magnet 78. This magnet 78 when energized in this manner by the removal of the short circuit normally closed around it, attracts its armature 79. The said armature when attracted causes the soft iron armature 80 to make contact with the permanent magnet 81, thereby absorbing the latter's magnetism and allowing the same to release its normally attracted armature 82 and permit the lever 83 to rise. The said lever in rising opens the valve 84, and permits the compressed air remaining in the chamber above the disk 65 to escape. In this way, the water automatically effects a closure of the relief valve before it reaches the outlet 66. Furthermore, the water in entering the chamber below the disk 61 causes the float 85 to rise and thereby bring the valve 86 into engagement with its seat 87. This closes the inlet of the by-pass 67 and prevents admission of water thereto.

The pressure operated circuit breaking device 70 is preferably constructed as shown in Fig. 25. It may consist of a suitable casing adapted to provide a chamber 88. At one end of this casing there is a supplemental chamber 89 containing a flexible diaphragm 90. The piping 69 communicates with this chamber 89 at one side of the diaphragm, while the rod or piston 91 is fixed to the diaphragm and projects through an opening at the opposite side. A pivoted lever 92 has one end connected with this rod or piston 91, and its other end connected by means of a flexible metallic connection 93 with the plunger 94 of the dash-pot 95. The spring contact finger 96 is normally in contact with the flexible connection 93. These two contacts, the springs 93 and 96, constitute a part of the normally closed short circuit or shunt extending about the releasing magnet in the master box 16 and the aforedescribed magnet 74. Normally, the air pressure in the piping is sufficient to hold the diaphragm 90 and the movable parts in the position shown in Fig. 25. But upon the opening of a sprinkler head, the pulsation in the pressure is sufficient to momentarily allow the diaphragm to spring back so as to exert a sudden pressure on the plunger 94. This sudden movement is sufficient to slightly bend or buckle the spring 93, thereby causing it to move out of contact with the spring 96. Obviously, however, the opening of the circuit in this manner is merely momentary, as the air escapes from the dash pot and allows the spring 93 to again make contact with the spring 96. Such being the case, the short circuit or shunt is opened and then immediately closed. Thus, as previously stated, and as hereinafter more fully described, this circuit breaking device is of a character to break the circuit and then instantly close it, so as to not only accomplish the energizing of the two electromagnets, but so as to also leave the short circuit or shunt intact and in such condition as to be available for signaling purposes. The releasing magnet 97 of the master box 16 is shown in Fig. 11, as are also the contacts 93 and 96, included in the shunt 26.

The float-operated circuit opening device 75ᵃ can be, and preferably is, constructed as shown in Figs. 27 and 28. As thus illustrated, it comprises a tube 98 screwed into the side of the riser and adapted to contain the swinging float 99. The said float carries a soft iron armature 100, adapted to rest normally in contact with the poles of the permanent magnet 101. The said permanent magnet is also provided with another soft iron armature 102, normally out of contact with the permanent magnet by reason of the latter's magnetism being normally completely absorbed by the armature 100. The movable armature 102 is mounted on the lever 103 and is thus adapted to open and close the aforedescribed normally closed contacts 76ª. Now with this arrangement, the water in entering the tube 98 causes the float 99 to rise, thereby allowing the magnetism of the permanent magnet to be exerted upon the armature 102. In this way, the contacts 76ª are separated, and the shunt 77 extending around the magnet 78 is broken. The said permanent magnet and associated parts can be inclosed by a box or casing 104 secured to the tube 98 by a padlock or other suitable device 105. This float operated device is of a character to open and close a circuit without the necessity of employing any movable parts which extend through the piping and through the chamber of the float, magnetism constituting the sole medium of connection between the float and the external parts. The float operated circuit breaking device 28 may also be constructed exactly as illustrated in Figs. 27 and 28.

The circuit opening device 38 can be of the construction illustrated in Fig. 25. The devices 34, 36 and 59 are, however, of a slightly different character. In these devices the spring 93 is preferably provided with insulation 106, inasmuch as the variation in the pressure in the tank 35, the pump 37 and the riser 1, when leakage occurs in the latter, is only gradual and does not involve a pulsation which is sufficient to operate the device shown in Fig. 25. A gradual release of the diaphragm 89 will bring the insulation 106 into contact with the spring 96, thereby breaking the circuit and giving the necessary alarm and signal.

The dry pipe valve 5 shown in Fig. 1 is of the construction shown in Fig. 5. It involves a movable valve 107 provided with upper and lower differential areas, the upper area being sufficiently large to insure a preponderance of downward pressure on the part of the air for the purpose of holding the valve normally closed. Ordinarily, the release of the air from the riser and distributing pipes is sufficient to allow this dry pipe valve to open instantly and admit the water to the distributing pipes. But suppose this dry pipe valve should become frozen, or should for any other reason stick and refuse to open when the air pressure is released. Now in order to guard against difficulty of this character, we provide a by-pass 108 extending from a point below the valve to the chamber 109 between the two differential areas of the valve 107. This by-pass is provided with a normally closed valve 110. This valve which controls the by-pass is maintained in its closed position by a permanent magnet 111 and a lever 112. This arrangement is similar in all respects to the magnet 71 and lever 72 which control the valve 68. The construction of the magnet 74 and associated parts is more fully shown in Figs. 22, 23 and 24. An electro-magnet 113 is associated with the permanent magnet 111 and provided with an armature arrangement for causing the magnet 111 to release the lever 112, in the same manner that the magnet 74 effects a release of the lever 72. It will be observed, however, that the armature 75 is adapted to keep the spring contacts 114 normally closed, and that these contacts are included in the shunt or short circuit extending around the said magnet 113. Consequently, when the magnet 74 is energized, the contacts 114 are allowed to separate, the short circuit 58 around the magnet 113 is opened, and the latter is allowed to then effect the release of the lever 112 and the opening of the valve 110. When opened, the valve 110 permits water to pass through the by-pass and exert pressure in the chamber 109. The sudden injection of water at great pressure into the chamber 109 will effectually open the valve 107. Thus the sprinkler heads are arranged to exert a certain amount of control both over the relief valve and the dry pipe valve. The pulsation caused by a sudden opening of a sprinkler head is always sufficient to effect an opening of the shunt 26, through the medium of the pressure device 70, and to thereby cause an energizing of the magnets 74, 78, 97 and 113, the magnet 78 not being energized until the water reaches the float operated circuit breaking device 75. (See Fig. 11.) It will be observed that all of these magnets are provided with means whereby a small short circuit or shunt is established about their coils as soon as their armatures are attracted, and in the case of the magnet 97, as soon as the clock-work is run down sufficiently to close the contacts 115. Thus the resistance of each magnet is beneficially and advantageously removed from the circuit of the loop, so as to lower its resistance and permit the master box to utilize the loop as a portion of the signaling circuit.

Fig. 8 illustrates another, and perhaps more preferable, form of relief valve. In this case, the valve comprises an upper disk 116 adapted to rest normally upon the valve seat 117, and held in its closed position by the pressure of a screw 118 on the trigger device 119. The arrangement for opening this valve, so as to release the air, comprises a pressure operated circuit breaking device 120, similar in all respects to the device 70, previously described. It also comprises a pressure operated impact device 121 connected by a branch pipe 122 with a pipe 123 leading to the device 120. This branch pipe 122 is provided with a controlling valve 124 adapted to be held normally closed by a permanent magnet 125 and a lever 126, similar in all respects to the devices previously described. The pressure operated impact device 120 can be constructed as shown in Fig. 26. It comprises a chamber 127 adapted to contain a flexible diaphragm 128. This chamber communicates at one side of the diaphragm with the pipe 122 and at the other side with an aperture through which extends the piston or plunger 129. This plunger, or impact member, as it may be called, is secured to the diaphragm and is adapted to strike the horizontal member 130 of the trigger device 119 when sufficient pressure is exerted upon the said diaphragm. Suppose now that a sprinkler head is opened. The pulsation causes the device 120 to open the shunt or short circuit extending around the magnet 131, thereby causing the permanent magnet 125 to release the lever 126. When released, this lever permits the valve 124 to open and allow air pressure to be exerted constantly upon the diaphragm 128. This kicks the trigger members out of place and permits the valve 116 to open. The air rushes out immediately and allows the water to enter the pipes quickly and in time to escape from the sprinkler head before the fire gains any considerable headway. The float 132 rises as soon as the water enters the valve casing, thereby causing the lower valve 133 to close the outlet normally controlled by the valve 116. The relief valve, regardless of construction, can be inclosed by a casing 134 having a suitable door held closed by the lock 135. The previously described tamper or circuit breaking device 136, of any suitable character, can be associated with this lock and included in the shunt 29. Thus, as previously described, any attempt to tamper with the relief valve mechanism will result in a breaking of the shunt 29 and the consequent transmission of a signal to headquarters.

If desired, the dry pipe valve can be constructed as shown in Fig. 6. This, like the valve shown in Fig. 8, is a well known and well understood form of valve. In Fig. 6 the maintenance of the valve inclosed within the casing 137 in its closed position is dependent upon the preservation of sufficient air pressure in the chamber 138. As long as the proper pressure is maintained in this chamber the piston 139 remains seated and prevents the trigger mechanism 140 from releasing the valve stem 141 of the dry pipe valve. The by-pass 142 extends around the dry pipe valve and connects with the chamber 138 at a point below the piston 139. Thus as soon as the by-pass valve 143 is opened by the energizing of the magnet 144, the water pressure admitted below the piston 139 forces it upward and thus allows the trigger mechanism to release the stem of the dry pipe valve. The magnet 144 is energized in the same way as the magnet 113 is energized, and the medium of connection between this magnet and the valve 143 is the same as in Fig. 5. In each case a permanent magnet is employed to keep the by-pass valve normally closed.

Fig. 11 illustrates diagrammatically the circuit connections existing between the relief and dry pipe valves of the character shown in Figs. 4 and 5. Fig. 12, however, illustrates diagrammatically the circuit connections existing between a relief valve of the character shown in Fig. 8 and a dry pipe valve such as the ones shown in Figs. 5 and 6, or even the one shown in Fig. 9. In Fig. 12 the pressure actuated circuit opening device 120 is employed to control a shunt extending around all three of the magnets. Thus when this shunt is opened as a result of a pulsation in the air pressure, all of the magnets are energized. This effects a simultaneous opening of the relief and dry pipe valves, and also a release of the normally wound up clock work in the master box.

Fig. 7 illustrates the method of arranging the piping in a building, and shows a system equipped with a relief valve such as shown in Fig. 8, and with a dry pipe valve such as the one shown in Fig. 5.

Fig. 9 illustrates another form of dry pipe valve. With the forms of dry pipe valve previously described, it is necessary that considerable air pressure be maintained in the dry portion of the piping in order to keep the dry pipe valve closed. This, however, is not necessary when a valve of the character shown in Fig. 9 is employed. In this figure the dry pipe valve 145 is held normally closed by the screw 146 which bears upon and locks a trigger device 147. The mechanism for releasing the valve thus locked in place is substantially like that shown in Fig. 8. In fact these two valves, to wit: those shown in Figs. 8 and 9, are exactly alike with the exception that in Fig. 9 it is not necessary to employ the float 132 and the valve 133. Furthermore, in Fig. 9 there is no pressure operated circuit breaking device, such as the one 120 in Fig. 8. In Fig. 9 there is, however, a pressure operated impact device 148, which is similar in all respects to the device 121 in Fig. 8, and which when operated is adapted to release the trigger devices 147 by producing an impact upon the trigger member 149. The pipe 150 extends from below the valve 145 and leads to the said impact device 148. The valve 151, similar to the valve 124, normally closes this pipe 150.

Fig. 14 illustrates another method of using the valve shown in Fig. 9. In this diagram it will be seen that all of the sprinkler heads are arranged in a parallel connection or shunt extending around the electro-magnet 152. This electro-magnet when energized is adapted to cause the permanent magnet 153 to release the lever 154 in the manner already described. The said electromagnet is connected in a shunt 155 extending around the releasing magnet of a master box 156. Thus the sprinkler heads and the said electro-magnets are connected in parallel in the said shunt. As the resistance of the contacts in the sprinkler heads is practically nothing, the current normally does not traverse the coil of the said electro-magnet. Now, with this arrangement, the opening of a sprinkler head opens the parallel connection 157 and thereby causes current to pass through the coil of the electro-magnet 152. The said magnet then becomes energized, attracts its armature, and thereby causes the permanent magnet 153 to release the lever 154, allowing the valve 151 to open. The admission of water through the pipe 150 causes the impact device 148 to trip the trigger device 147, thereby allowing the water pressure to open the valve 145. With this arrangement, only a float-operated valve 158 is necessary at the upper part of the riser. This valve permits the air to escape as the water fills the piping, but closes promptly as soon as the water reaches it. This arrangement also preferably involves another master box 159 having a shunt 160. The said shunt 160 includes a tamper or circuit breaking device 161 on the main valve of the piping, and also another suitable circuit breaking device 162 on the casing 163 which incloses the dry pipe valve. Thus the master box 159 will transmit a signal whenever the said main valve or the dry pipe valve is tampered with. A check valve 164 is preferably provided in the riser at a point immediately above the dry pipe valve shown in Fig. 9.

Any suitable sprinkler head may be employed for accomplishing the results and methods of operation set forth in connection with Fig. 14. For example, the sprinkler head may be provided with a pair of contacts 165, normally connected by the contact piece 166. The conductors of the parallel connections 157 can connect with the binding posts 167 upon which the said contacts 165 are mounted. Thus the sprinkler heads include the said normally closed contacts. The wiring of the connection 157 can be inclosed in the tubing or piping 168 and a split collar 169 can be employed for connecting the top or crown 170 of the sprinkler head with the said tubing. Preferably, each sprinkler head is provided with a copper seat 171 adapted to encircle the outlet 172. A pair of upper interlocking members 173 and 174 are arranged with their middle or interlocking portion bearing against the under side of the crown or top 170. The lower locking members 175 and 176 have their outer ends partially curled around and soldered to the depending end portions of the interlocking members 173 and 174. These soldered joints are preferably reinforced by bent pieces of wire 177 and 178. The lower depending end portions of the members 175 and 176 engage a seat 179 in the top of the valve or button 180. The end portion 181 of this valve or button is preferably composed of carbon and is rounded or otherwise adapted to fit the valve seat provided by the copper ring 171. The contact 166 is held normally in place to complete the circuit by means of the rod 182 having its lower end adapted to be supported by a projection 183 on the top of the interlocking members. Preferably, this said rod extends through an adjustable screw threaded plug 184. The deflector or device 185 for producing the spray is preferably screwed upon the upper end of the frame or body 186 of the sprinkler head. With this arrangement, the sprinkler head is opened as soon as the soldered joints are softened, and the giving away of the locking members also releases the contact piece 166 and allows the spring 187 to press it downward and thereby open the circuit of the parallel connection 157. The peculiar arrangement of the locking members is very efficient in keeping the sprinkler head closed. The screw threaded plug 184 can be screwed down until the desired pressure or tension is obtained. If desired, the electrical contacts can be omitted, as indicated in Fig. 21.

Fig. 10 illustrates the method of installing the piping of a system involving a dry pipe valve and sprinkler heads of the character shown in Figs. 14 and 9. It will be understood, however, that the piping of the sprinkler or automatic fire extinguisher system can be installed in any suitable or approved manner.

It is of course obvious that the diaphragm device shown in Fig. 25 can be employed to effect a mechanical release or opening of a valve, as well as an electrical releasing or opening of such valve. For example, an arrangement such as shown in Fig. 29 may be employed. In this figure the flexible spring 188, which corresponds to the flexible spring 93 is provided with teeth adapted to engage the teeth on a pivoted lever 189. 190 may represent the end of one of the levers previously described as a means for enabling a permanent magnet to hold a valve in a closed position. The end of this lever 190 is locked against movement by the pin 191, the lower end of which latter engages the upper end of the lever 189. Thus, upon a sudden pulsation of the air pressure, the diaphragm will be given a vibratory movement sufficient to cause the spring 188 to release the lever 189, and to thereby release the lever or other movable member 190. In such case a resistance coil 192 can be employed to maintain the electrical continuity of an electric circuit which normally includes the contact and metal portions 188 and 189. Thus with the arrangement shown in Fig.

29, both a mechanical and an electrical action or function may result from the vibratory movement of the diaphragm controlling the pivoted lever 193, which latter corresponds to the lever 192.

The various master boxes, such as the master boxes 16, 22 and 24, can be of any suitable known or approved construction. Preferably, however, and in order to obtain the combinations and resulting operations previously described, said master boxes are of the construction and character illustrated in Figs. 31 and 32. As the master boxes are, therefore, alike in construction and mode of operation, a description of the box 16 will suffice for all. The box shown in Figs. 31 and 32 involves normally wound up clock work 194 operated by a spring 195. This spring is mounted on the crank shaft 196, which is provided with the crank handle 197, the box in this respect being very similar to the ordinary and well known call box. This clock work is maintained in a normally wound up condition by the magnet armature 198, which is adapted to normally engage the pendulum or vibratory member 199 of the escapement. The previously described electro-magnet 97 is arranged immediately below this armature in a position to attract the latter when energized. The main shaft 200 of the clock work is provided with two disks or contact wheels 201 and 202, the former being normally insulated from the said shaft. The insulated spring contact finger bears against the disk or wheel 201. As illustrated, the finger 203 is electrically connected with one terminal of the magnet 97 while the other terminal of this magnet is connected with the insulated binding post 205. An insulated binding post 206 is connected with the contact finger 204. One line connection connects with the binding post 205, while the other line connection connects with the binding post 207, the latter being non-insulated or electrically connected with the metallic casing 208 of the said box. The wires of the shunt 26 are connected to the binding posts 205 and 206, as indicated. The contacts 115, one of which is on the crank shaft 196, are adapted to close a short circuit around the magnet when the clock work is released. The contacts 115 are the ones already described and shown diagrammatically in Figs. 11 and 12. A spring held locking lever 210 is adapted to engage the armature 198, when the latter is attracted by the magnet 97, and to hold the said armature in its depressed condition until the clock work has run down and the signal has been transmitted. The finger or contact 211 contacts with the binding post 207, and is adapted to bear constantly against the back of the disk 201. Suppose that a break occurs in the shunt 26, or that the resistance of this shunt is suddenly increased to some extent. In such case, sufficient current will be diverted through the coils of the magnet 97 to energize the latter's cores, and to attract the armature 198. This armature when attracted releases the clock work and allows the contact disks 201 and 202 to rotate in the direction indicated by the arrow. As soon as the disks start to revolve, the circuit from the binding post 207 through the casing of the shaft 200, and thence through the disk wheel 202, the spring contact 203 and the magnet 97, is broken. This circuit is not reëstablished or closed until the disks have rotated for half their circumference. The other circuit extending from the binding post 207 to the contact finger 211, through the wheel or disk 201, and through the contact finger 204 and the shunt 26 is also broken, but is immediately reëstablished or closed several times by the teeth or contacts of the said disk or wheel 201. Thus a make-and-break action is produced and results in a transmission of a signal over a circuit including the shunt 26, providing of course that the signal initiating device in said shunt is of a character to open the normal path of current, so as to at least momentarily energize the magnet 97 and to then immediately maintain the electrical continuity of the shunt, so as to leave it available for use as a portion of the signaling circuit. As soon as the teeth or contacts on the wheel 201 have ceased to effect a make-and-break action in the circuit, the teeth on the disk 202 are then brought into play, producing a second or supplemental make-and-break action through a circuit including the shunt 209 of the contacts 115. It is obvious that this method of signaling can be varied to any desired extent. The object of the arrangement is to enable the master box to transmit a signal of a certain character to indicate fire, tampering with some of the valves, a fall in the pressure, or other like abnormal conditions, and to transmit a signal of a different character when a mere break occurs in the shunt containing the signal initiating devices. In case of such a break, only the disk or wheel 202 will produce a make-and-break action in the circuit, and the signal thus transmitted will of course be of such character as to be easily distinguished from the long signal which is given to indicate fire or any of the other abnormal conditions.

The clock shown in Fig. 1 may be of any suitable known or approved construction. It may, as will be readily understood, involve suitable clock work and mechanism for recording the time at which an alarm was given. For example, it may be provided with the rotary paper disk or like moving sheet 212, adapted to be pierced by a needle 213. This needle can be actuated by the armature 214 arranged in front of the electro-magnet 215. A drop 216, held in its normal position by the said armature, can be employed for opening the contacts 217 and for closing the contacts 218. The contacts 217 which tend normally to spring apart are in the circuit of the said magnet, while the contacts 218, which are normally open, are in the circuit of the alarm 41. Thus when the clock is operated and the needle actuated the circuit of the magnet is broken and the circuit of the alarm is closed. It will be necessary for the attendant to restore the drop 216 in order to render the clock operative to again record an alarm. As previously described, the magnet 215 will only be energized when the resistance of the loop 7—7 is materially increased in any of the ways specified.

It will be understood that the tank 35 is connected with a source of air pressure, whereby water may be supplied to the piping of the extinguisher system. It will also be understood that the tank 39 is adapted to supply water to said piping, but only by reason of gravity. Thus the two tanks, one working under air pressure and the other under hydrostatic pressure, can be employed for supplying water at the pressure necessary for forcing it up through the piping and out through the sprinkler heads. It will also be seen that the annunciators serve as the means for preserving the electrical continuity of the shunt circuit for signaling purposes. Each annunciator, as explained, is arranged in parallel with a signal initiating device, preferably a mere circuit breaking device. But the resistance of the annunciator coil is, in each instance, much greater than the resistance of the signal initiating device, and consequently as soon as the latter is operated sufficient current is diverted through the releasing magnet of the master box to effect a release of the clock work and the consequent transmission of the signal to headquarters. And, as previously explained, the first part of this signal is transmitted over a circuit including the shunt and the small short circuit connection around the coil of the annunciator. For this reason, each annunciator, as stated, is adapted to serve as the means for maintaining the electrical continuity of the shunt, so as to make the latter available for signaling purposes, and so as to enable the master box to transmit a signal of such character as to be readily distinguished from a signal which will be transmitted when a mere break occurs in one of the shunt conductors.

What we claim as our invention is:

1. The combination with an automatic fire extinguisher system comprising a riser, having therein a dry-pipe valve and a relief valve, distribution pipes connected to the riser between the said valves, and sprinkler heads on the distribution pipes, of a source of current supply, circuit connections, valve-opening current responsive devices in said circuit, associated one with each of said valves, and circuit controlling devices, to the operation whereof both valve-opening devices respond, associated with the piping for actuation by air pressure variations therein.

2. The combination with an automatic fire extinguisher system comprising a riser, having therein a dry-pipe valve and a relief valve, distribution pipes connected to the riser between said valves and sprinkler heads on said distribution pipes, of a source of current supply, means operated thereby for effecting the opening of the dry pipe and relief valves when one or more sprinkler heads open, and means operated thereby for effecting a closure of the relief valve when the water reaches a predetermined level in the piping system.

3. An automatic fire extinguisher system, comprising dry distributing pipes, sprinkler head on said distributing pipes, a dry pipe valve separating the distributing pipes from the source of water supply, a relief valve connected with the dry portion of the piping, a suitable source of current and electrical devices operated thereby for effecting an opening of said relief valve, and a circuit-breaking device also connected with the dry portion of the piping and adapted to control the flow of current through said electrical devices, said circuit-breaking device comprising a pair of separable contacts and a flexible diaphragm, the latter being normally subject to air pressure.

4. An automatic fire extinguisher system, comprising dry distributing pipes normally filled with compressed air, sprinkler heads on said distributing pipes, suitable piping for connecting the distributing pipes with the source of water pressure, a dry pipe valve for separating the distributing pipes from the source of water pressure, a relief valve connected with the dry portion of the piping, and a suitable source of current and means operated thereby for opening said relief valve upon the opening of one or more of said sprinkler heads, the air pressure in the dry piping constituting the medium of operative connection between the said means and said sprinkler heads.

5. An automatic fire extinguisher system comprising suitable piping, a plurality of sprinkler heads, a dry pipe valve, a relief valve, a suitable source of current and means operated thereby for opening the said relief valve and thereby releasing the air from the piping upon the opening of one or more of said sprinkler heads and subsequently effecting a closure of said relief valve, a signal transmitting mechanism and means whereby said mechanism is set in operation by the opening of the relief valve, and a signal receiving device suitably connected with said signal transmitting mechanism.

6. An automatic fire extinguisher system, comprising dry piping filled with compressed air, a dry pipe valve for separating the dry piping from the source of water pressure, springler heads on the dry piping, a relief valve connected with the dry piping, a suitable source of current means operated thereby for effecting an opening of the relief valve and thereby releasing the air from the piping upon the opening of one or more of said sprinkler heads and means operated thereby for subsequently effecting the closure of said relief valve, a district messenger line, a signal transmitting mechanism connected with said line and means whereby said mechanism is operated upon the opening of said relief valve, and a district messenger signal receiving apparatus also connected with said line.

7. An automatic fire extinguisher system, comprising a suitable riser, distributing pipes leading from said riser, the distributing pipes and a portion of the riser being adapted to contain compressed air, a dry pipe valve separating the dry piping from the source of water pressure, sprinkler heads on the distributing pipes, a relief valve connected with the dry piping, electro-magnets associated with said valves, means also associated with said valves adapted to be operated to open the valves when the said magnets are energized, a line circuit including said electro-magnets, a suitable source of current in said line circuit, and means controlled through the medium of the air pressure in the piping for controlling the flow of current through said magnets.

8. An automatic fire extinguisher system, comprising a suitable riser, distributing pipes connected with the riser, the distributing pipes and the riser containing compressed air, a dry pipe valve separating the dry piping from the source of water pressure, sprinkler heads on the distributing pipes, switch contacts arranged outside of the riser, a float arranged in a chamber, connected with the dry portion of said riser, a permanent magnet and a pair of armatures through the medium of which said switch contacts are controlled by said float, and a signal controlled by said switch contacts.

9. An automatic fire extinguisher system, comprising a suitable riser, distributing pipes leading from the riser, the same containing compressed air, a dry pipe valve separating the dry piping from the source of water pressure, a relief valve connected with the dry portion of the piping, said relief valve being held normally closed by the air pressure, a by-pass extending around said relief valve, a normally closed valve in said by-pass, a suitable source of current and means operated thereby and means controlled by the sprinkler heads through the medium of the air pressure for opening said by-pass valve upon the opening of one or more of said sprinkler heads, whereby the opening of the by-pass valve permits the compressed air to pass around and open the relief valve, the latter when opened being adapted to effect a quick release of the air from the dry piping.

10. An automatic fire extinguisher system, comprising a suitable riser, distributing pipes leading from said riser, the same containing compressed air, a dry pipe valve separating the dry piping from the source of water pressure, sprinkler heads on the distributing pipes, a relief valve connected with the dry piping and held normally closed by the air pressure, said relief valve having differential areas, and means controlled by the sprinkler heads for admitting air pressure to the larger area of said relief valve for the purpose of opening the latter upon the opening of one or more of said sprinkler heads.

11. An automatic fire extinguisher system, comprising suitable piping, a plurality of sprinkler heads, a dry pipe valve, a relief valve and means whereby the relief valve is automatically opened by the opening of one or more of said sprinkler heads, a signal receiving device, and a signal transmitting device suitably connected with said signal receiving device, and a shunt connection adapted when opened to effect both a release of said signal transmitting device and an opening of said relief valve.

12. An automatic fire extinguisher system, comprising dry piping, a dry pipe valve separating the dry piping from the source of water pressure, sprinkler heads on the dry piping, a relief valve connected with the dry piping, an electro-magnet and means operated thereby for opening the relief valve, a source of current suitably connected with said magnet, a shunt around said magnet, a normally closed switch in said shunt, and a pressure device controlled by air pressure in the piping whereby said switch is automatically opened upon the opening of one or more of said sprinkler heads.

13. An automatic fire extinguisher system, comprising suitable piping, a dry pipe valve separating the dry portion of the piping from the source of water pressure, a relief valve connected with the dry portion of the piping, means controlled by the sprinkler heads and adapted to open said relief valve upon the opening of one or more of said sprinkler heads, a steam pump for maintaining the water pressure, and signal transmitting mechanism connected with both the said pump and the said relief valve, and a signal receiving device connected with said signal transmitting device, together with a suitable source of current connected in circuit with said signal transmitting and receiving devices.

14. An automatic fire extinguisher and signaling system, comprising a riser, distributing pipes leading from said riser, the same being filled with compressed air, a dry pipe valve separating the distributing pipes from the source of water pressure, sprinkler heads on the distributing pipes, a relief valve connected with the dry portion of the piping, a plurality of receptacles adapted to contain water, a steam pump for maintaining the water pressure, an air pressure tank for maintaining the water pressure, a main valve in the riser below the dry pipe valve, a signal initiating device associated with said main valve, another signal initiating device associated with said relief valve, other signal initiating devices associated with said receptacles and also with said pump and air tank, a master box provided with a shunt including all of said signal initiating devices, a bank of annunciators, each annunciator being connected in parallel with one of said signal initiating devices, a signal receiving device connected with said master box, and a suitable source of current connected in circuit with said master box and signal receiving device.

15. An automatic fire extinguisher system, comprising a riser, distributing pipes leading from said riser, sprinkler heads on said distributing pipes, the distributing pipes being filled with compressed air, a dry pipe valve separating the dry portion of the piping from the water pressure, a relief valve and means under the control of the sprinkler heads for effecting an opening of said relief valve upon the opening of one or more of said sprinkler heads, each sprinkler head comprising a member adapted to close the outlet of the head, a couple of horizontally disposed members interlocked at the center, and a couple of lower members having their lower ends bearing upon said closing member and their outer and upper ends soldered to the outer end portions of said interlocking members.

16. An automatic fire extinguisher system, comprising a suitable riser, distributing pipes leading from the riser, a dry pipe valve in the riser separating the distributing pipes from the source of water pressure, a relief valve connected with the dry portion of the riser, a plurality of sprinkler heads and means controlled thereby for opening said relief valve upon the opening of one or more of said sprinkler heads, said means involving an electro-magnet and a source of current and a normally closed shunt extending around said magnet, and a normally open shunt extending around said magnet and adapted to be closed by the magnet when the normally closed shunt is opened.

17. An automatic fire extinguisher system, comprising a suitable riser, distributing pipes leading from said riser, a dry pipe valve in the riser separating the distributing pipes from the source of water pressure, a relief valve connected with the dry portion of the riser, and a plurality of sprinkler heads and means controlled thereby for opening said relief valve upon the opening of one or more of said sprinkler heads, said means comprising a permanent magnet and means for maintaining the valve in its normally closed condition, and an electro-magnet and a source of current and a normally closed shunt around said magnet, said electro-magnet being provided with means for causing the permanent magnet to release the said means for maintaining the valve in its normal condition when the electro-magnet is energized by the opening of one or more sprinkler heads and the consequent opening of said shunt.

18. An automatic fire extinguisher system, comprising a suitable riser, distributing pipes leading from said riser, a dry pipe valve in the riser separating the distributing pipes from the source of water pressure, a relief valve connected with the dry portion of the riser, and a plurality of sprinkler heads and means controlled thereby for opening said relief valve upon the opening of one or more of said sprinkler heads, said means comprising a permanent magnet and means for maintaining the valve in its normally closed condition, and an electro-magnet and a source of current and means operated thereby for opening said relief valve.

19. An automatic fire extinguisher system, comprising a suitable riser, distributing pipes leading from said riser, a dry pipe valve in the riser separating the distributing pipes from the source of water pressure, a relief valve connected with the dry portion of the riser, and a plurality of sprinkler heads and means controlled thereby for opening said relief valve upon the opening of one or more of said sprinkler heads, said means comprising a permanent magnet and means operated thereby for maintaining the relief valve in its normally closed condition, an electro-magnet and a source of current and a normally closed shunt around said magnet and means operated by said electro-magnet for causing said permanent magnet to release the said means for maintaining the relief valve in its normally closed condition, and a pressure operated device adapted to open said shunt and thereby effect an opening of the relief valve upon the opening of one or more of said sprinkler heads.

20. An automatic fire extinguisher system, comprising a suitable riser, distributing pipes leading from said riser, a dry pipe valve in the riser separating the distributing pipes from the source of water pressure, a relief valve connected with the dry portion of the riser, a plurality of sprinkler heads and means controlled thereby for opening said relief valve upon the opening of one or more of said sprinkler heads, a casing inclosing the means for opening said relief valve, a master box provided with a shunt including a signal initiating device on said casing, and a signal receiving device connected with said master box, said signal initiating device comprising means for opening the normal path of the current, means for maintaining the electrical continuity of the shunt, whereby the said master box may transmit a signal over a circuit including said shunt when the said signal initiating device is operated and whereby the said master box may transmit a different signal when a mere break occurs in said shunt.

21. An automatic fire extinguisher system, comprising a suitable riser, distributing pipes leading from said riser, a dry pipe valve in the riser separating the distributing pipes from the water pressure, a relief valve connected with the dry portion of the riser, a plurality of sprinkler heads and means controlled thereby for opening said relief valve and dry pipe valve upon the opening of one or more of said sprinkler heads, a casing inclosing the means for operating the relief valve, a signal transmitting device provided with a shunt including a signal initiating device on the said casing, an annunciator connected in parallel with said signal initiating device, and a signal receiving device suitably connected with said signal transmitting device.

22. An automatic fire extinguisher system, comprising a suitable riser, a dry pipe valve in the riser, distributing pipes connected with the riser and separated from the source of water pressure by the said dry pipe valve, sprinkler heads on the distributing pipes, a float-operated switch device connected with the dry portion of the riser, a signal transmitting device provided with a shunt including the said switch device, an annunciator connected in parallel with said switch device, a signal receiving device connected with said signal transmitting device and a normally open shunt around the annunciator magnet adapted to be closed when the latter is operated.

Signed by us at Chicago, Illinois, this 26th day of May 1903.

RICHARD B. HEWITT.
JAMES G. NOLEN.

Witnesses:
CHARLES W. HICKOK,
WM. A. HARDERS.